Feb. 12, 1924.
W. O. WILLIAMS
OVERSHOT WATER WHEEL
Filed Sept. 29, 1922
1,483,705
Fig. 1.
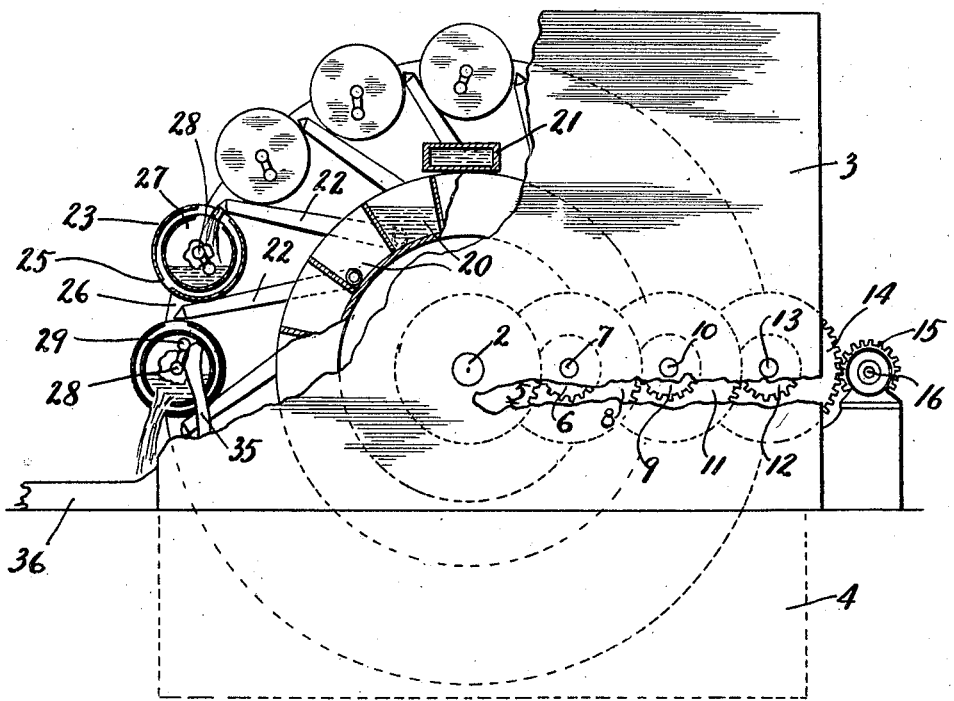
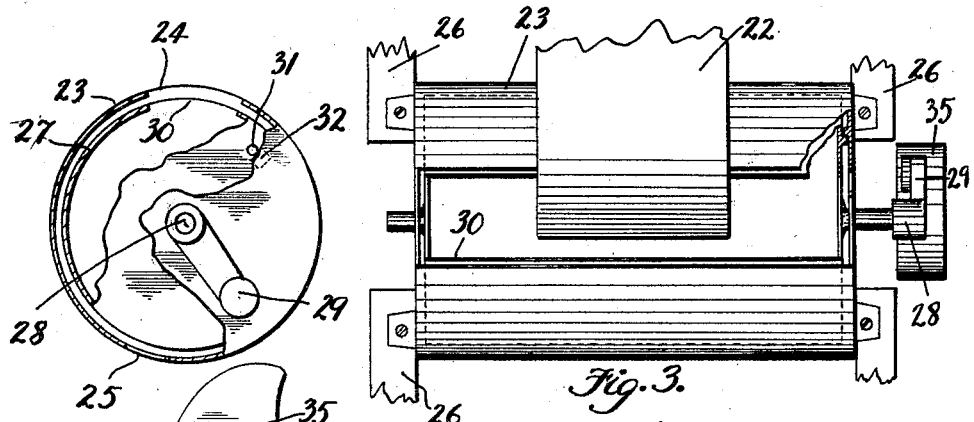
Fig. 2.
Fig. 3.
Inventor,
William O. Williams
by Hazard and Miller
ATTORNEYS Patented Feb. 12, 1924.

1,483,705

UNITED STATES PATENT OFFICE.

WILLIAM O. WILLIAMS, OF REDLANDS, CALIFORNIA.

OVERSHOT WATER WHEEL.

Application filed September 29, 1922. Serial No. 591,293.

*To all whom it may concern:*

Be it known that I, WILLIAM O. WILLIAMS, a citizen of the United States, residing at Redlands, in the county of San Bernardino and State of California, have invented new and useful Improvements in Overshot Water Wheels, of which the following is a specification.

This invention relates to overshot water wheels and has for its object to provide a power transmitting mechanism wherein there is a multiplication of speed from a slow moving power wheel to a fast moving driven pinion which may be utilized for driving electric motors and the like.

Other objects and advantages will be made manifest in the following specification of an embodiment of the invention illustrated in the accompanying drawings, wherein:

Figure 1 is a side elevation with parts broken away to illustrate elements.

Figure 2 is an end view of one of the wheel buckets.

Figure 3 is a detail plan elevation of one of the buckets and the water feed spout.

The invention is shown as embodied in an apparatus including a water wheel shaft 2 suitably journaled and which may be arranged within a wheel house 3, the lower portion of which extends into a sump 4. On the shaft 2 is secured a gear 5 which engages with a pinion 6 on a shaft 7 which in turn carries a gear 8 driving a pinion 9 on a shaft 10. On the shaft 10 is a gear 11 engaging a pinion 12 secured on a shaft 13 having a gear 14 driving a pinion 15 which may operate a motor shaft 16, this train of gears forming a speed multiplying means.

A feature of the invention consists of a wheel structure having an annular series of chambers 20, above the top of which series is a water sluice 21, this being connected to any conduit or source of supply and discharging the water into the chambers 20. The buckets of the wheel are each provided with leader spouts 22 extending substantially tangentially into the respective buckets so that during rotation of the wheel the water flows from each chamber through its spout 22 which is provided with a discharge at its outer end.

The water discharged from the several spouts 22 falls into a horizontal cylinder 23 having an open top mouth 24 immediately adjacent the outlet of a respective spout 22. The cylinders 23 are provided with discharge outlets 25 at the bottom. These cylinders are fixedly secured to carrying rings 26 forming the overshot wheel structure which is rigid on the main axle 2. Concentrically arranged in each cylinder 23 is a rotary bucket 27 fixed on a shaft 28 passing through an end of its cylinder 23. One end of each shaft 28 is provided with a crank 29 which tends to rotate the rotary bucket 27 to such position as to maintain the outlet 30 of its bucket uppermost at the time that the rotary buckets and the cylinders 23 are passing on the discharge side of the water spouts 22.

The mouth 30 of each of the rotary buckets 27 is held in register at the filling position by suitable stop means consisting of a pin or shoulder 31, Fig. 2, swung into abutment against a contiguous stop abutment 32 which may be provided on the inner face of one of the end walls of the cylinders 23.

During operation of the device water flows from the sluice 21 successively into the receiving chambers 20 of the wheel and as the spouts 22 thereof approach the horizontal position in their downward movement the water flows from the spouts into the registered mouths 24 and 30 of the cylinders 23 and the rotary buckets 27, the latter thus being loaded utilize the weight of the water as an agent for rotating the water wheel.

After each of the loaded tiltable buckets 27 move downwardly a suitable degree by the rotation of the overshot wheel, the cranks 29 move into engagement with a fixed cam 35 provided in the housing, with the result that as each of the buckets 27 move down the crank arm 29 is rotated about its own axis and this swings the mouth 30 of each bucket to a lowermost discharge position, as is clearly shown in Fig. 1, and the water pouring out of the rotary bucket 27 through the discharge outlet 25 of its cylinder 23 and passing to the spillway 36.

From the above it will be seen that I have provided a novel construction of overshot wheel.

The cylinders 23 are for the purpose of controlling the rate of discharge of water after the same is emptied from the buckets 27. The buckets rotate from a loading to an unloading position at a short arc of movement of the wheel, and, in order to obtain the benefit of the weight of water, the cylinders 23 are provided with check-discharge apertures to hold back the water for a suitable period of time if the buckets themselves have been unloaded.

Further embodiments, modifications and variations may be resorted to within the spirit of the invention as here claimed.

What is claimed is:

1. In an overshot wheel, an annular series of water chambers, each having an outlet, a series of tiltable buckets disposed to receive the discharged water from respective water chambers, means for tilting the said buckets during the rotation of the wheel, and an encasing cylinder for each of the tiltable buckets, said cylinders each being provided with inlet and outlet mouths and being operative to check the discharge of water after it is released from the inverted buckets.

2. In an overshot water wheel, a wheel frame and an axle therefor, a series of annularly arranged water receiving chambers, each having an outwardly extending, substantially tangential discharge spout, a series of cylinders at the outlets of the spouts, rotary water buckets in the cylinders, and means for tilting the buckets during the downward movement thereof while loaded to discharge the water from the buckets, the cylinders having discharge apertures in their lower portions for checking the rate of discharge of the water after it is emptied from the buckets.

In testimony whereof I have signed my name to this specification.

WILLIAM O. WILLIAMS.